(12) United States Patent
Johnston (10) Patent No.: US 12,317,876 B1
(45) Date of Patent: Jun. 3, 2025

(54) PORTABLE ICE FISHING APPARATUS

(71) Applicant: Corey Johnston, Gray, ME (US)

(72) Inventor: Corey Johnston, Gray, ME (US)

(*) Notice: Subject to any disclaimer, the term of this patent is extended or adjusted under 35 U.S.C. 154(b) by 236 days.

(21) Appl. No.: 17/976,527

(22) Filed: Oct. 28, 2022

Related U.S. Application Data (60) Provisional application No. 63/272,897, filed on Oct. 28, 2021.

(51) Int. Cl.
*A01K 97/01* (2006.01)

(52) U.S. Cl.
CPC .................................. *A01K 97/01* (2013.01)

(58) Field of Classification Search
CPC ...................................................... A01K 97/01
See application file for complete search history.

(56) References Cited

U.S. PATENT DOCUMENTS

| | | | | |
|---|---|---|---|---|
| 3,173,436 A * | 3/1965 | Peters | .................... | E04H 15/001 52/36.2 |
| 3,507,293 A * | 4/1970 | Du Bray | ................ | A01K 97/01 135/117 |
| 3,971,395 A * | 7/1976 | Lipinski | .................. | E04H 15/48 D25/16 |
| 5,341,588 A * | 8/1994 | Lizotte | .................. | A01M 31/02 135/901 |
| 5,622,198 A * | 4/1997 | Elsinger | .................. | E04H 15/48 135/128 |
| 10,612,265 B1 * | 4/2020 | Walter | .................. | E04H 15/001 |
| 2003/0140573 A1 * | 7/2003 | Marcinkowski | .... | E04B 1/34321 52/79.5 |
| 2006/0048459 A1 * | 3/2006 | Moore | ................ | E04B 1/34321 52/79.1 |
| 2012/0211042 A1 * | 8/2012 | Richter | ................ | E04H 15/001 135/143 |

* cited by examiner

*Primary Examiner* — Brian L Swenson
(74) *Attorney, Agent, or Firm* — Malloy & Malloy, PL; Rafay Asrar (57) ABSTRACT

The present invention is directed to a portable ice fishing apparatus that is configured to provide easier transport in various terrains and weather conditions. The apparatus includes a base comprised of a plurality of foldable walls. The foldable walls may be configured to adopt a first configuration wherein each of the plurality of walls is in a down position such that a platform is formed, and a second position wherein at least one of the plurality of walls is in an up position such that a shelter is formed.

20 Claims, 8 Drawing Sheets

PORTABLE ICE FISHING APPARATUS

CROSS-REFERENCE TO RELATED APPLICATION

This application claims the benefit of U.S. provisional patent application Ser. No. 63/272,897 filed on Oct. 28, 2021 which is incorporated by reference herein in its entirety.

FIELD OF THE INVENTION

The present invention relates generally to an apparatus and method for ice fishing. More particularly, the present invention relates to a portable and expandable ice fishing platform with a removable cover. The platform may be configured to expand through foldable walls which make up the base of the platform, and when folded up the platform may convert into a small shelter. On a bottom side of the base of the platform may be skis or other mechanism for transporting the platform. The platform may include a removable panel configured to allow a user to ice fish from the platform.

BACKGROUND OF THE INVENTION

Ice fishing is an old method of fishing wherein fisherman catch fish using a line and hook through an opening made in the ice on a frozen body of water. Ice fishing originated as a way of survival. In many periods of the year, much of the Earth would be covered in ice, and access to food was not straightforward. Ice fishing provided a means of nourishment during such times.

The origins of ice fishing are not fully known, however there is ample evidence of the Native peoples of North America engaging in the practice. For example, Native American tribes in the Midwest, such as the Ojibwa Indians, used tools to chip away at ice and then used wooden decoys and spears to hunt fish. A decoy, often carved in the shape of a fish, would be used to lure the fish, while the spear was used to hunt and catch them.

While ice fishing in the past may have been driven for sustenance reasons, modern ice fishing today is seen as a sport. Ice fishing is very popular in Northern Europe, as well as across many parts of North America such as the upper Midwest, New England, and Canada. The practice of ice fishing has also evolved in such a way that there is now a lot of specialized equipment used that were not common in the past. For instance, instead of using axes to form a hole in the ice, anglers may use ice saws, augers, or chisels which greatly increase speed and efficiency. Ice fishing rods, which are shorter than standard rods, are then lowered into the hole with bait or decoys attached. The rod is either handheld or employed using a "tip" method. In the tip method, a device is placed over the hole to hold the fishing line. When a fish bites, small flags attached to the line pop up to alert the fisherman.

Today, many modern ice fishermen take advantage of sophisticated electronics to improve their chances of catching fish. GPS devices can locate spots to create a good fishing hole, while flasher system can then utilize sonar to sense depth and movement of the fish below the ice. Such technologies allow fisherman and anglers potentially greater access to fish than ever before. Previously, fisherman may have been limited only to their local vicinities.

Along with the advent of technologies designed to aid in catching fish, shelters used by ice fisherman have also increased. Such shelters grew out of necessity due to fisherman and anglers going on longer expeditions that may be farther away from home. Today, ice fisherman use shelters known as ice shanties. An ice shanty is a portable shelter that is dragged or towed using a snowmobile, ATV, or truck, and then placed on a frozen body of water and used when a person is ice fishing. Such shelters range from basic models made of wood or metal to portable modern structures, resembling nylon tents to more upscale enclosures that may include amenities like heaters, bathrooms, or televisions.

While ice shanties provide a great benefit to ice fisherman and anglers, their use still has a number of drawbacks. First, most ice shanties are difficult to transport in the winter and are incapable of holding all the equipment often need by modern ice fisherman. Secondly, most ice shanties are not expandable and may include complex rigging to properly place on a frozen body of water.

Accordingly, there remains a need in the art for a solution to at least one of the aforementioned problems. For instance, a portable, but expandable ice fishing platform and shelter such that a fisherman may be able to modulate the amount for space desired. Additionally, it is desired that the platform and shelter be able to more easily be transported in all types of seasons and weather conditions, such that the shelter can more easily accommodate all the necessary equipment. Lastly, it is desired that the platform and shelter better be able to hold to a frozen body of water than conventional ice shanties.

SUMMARY OF THE INVENTION

The present invention is directed to a portable ice fishing apparatus that is configured to provide easier transport in various different terrains and weather conditions. The apparatus includes a base comprised of a plurality of foldable walls. The foldable walls may be configured to adopt a first configuration wherein each of the plurality of walls is in a down position such that a platform is formed, and a second position wherein at least one of the plurality of walls is in an up position such that a shelter is formed. Additionally, at least one of the foldable walls may include a removable panel configured to allow a user to ice fish through the removable panel. A bottom surface of the platform may include a transportation mechanism such as skids or casters to aid in transporting the platform and shelter through various terrains and weather conditions. A method of ice fishing using the platform and shelter is also provided.

The portable ice fishing apparatus may solve a number of problems currently associated with conventional ice shanties. Firstly, the apparatus in configurable to be used as both a platform, as well as a shelter. When configured as a shelter, the apparatus may be used to store equipment and other materials commonly used during ice fishing. This may a more efficient means of transporting necessary equipment during ice fishing trips. Secondly, the apparatus may include a transportation mechanism on a bottom surface of apparatus, further lending to easier transport. The transportation mechanism may include skis or casters. Lastly, the ice fishing apparatus is made modular by allowing a user to control the space occupied by the platform by choosing the number of foldable walls place in an up or down position.

In a first implementation of the invention, a portable ice fishing apparatus comprises:
 a plurality of foldable walls forming a base;
 a transport mechanism affixed to a bottom surface of the base;

a removable panel within at least one of the foldable walls of the base; wherein the apparatus is configured to adopt:

a first configuration wherein each of the plurality of foldable walls are in a down position forming a platform; and a second configuration wherein at least one of the plurality of foldable walls is in an up position forming a shelter.

In a second aspect, the plurality of foldable walls may be connected through a hinge system.

In another aspect, the hinge system may include a single dowel connecting each of the plurality of foldable walls and forming a full length hinge.

In another aspect, the plurality of foldable walls may form a square when the apparatus is in the first configuration.

In another aspect, the plurality of foldable walls may form a hexagon when the apparatus is in the first configuration.

In another aspect, at least one of the plurality of foldable walls may form a side wall when in the second configuration.

In another aspect, the plurality foldable walls may be comprised of wood.

In another aspect, each of the of the foldable walls may have a top surface and a bottom surface.

In another aspect, each of the bottom surfaces of each of the plurality of walls may include outer struts configured for support.

In another aspect, the bottom surface of the foldable walls may include collapsible legs.

In another aspect, when in the first configuration, the legs may be configured to provide clearance for the platform.

In another aspect, when in a second configuration, the shelter may be configured to hold various items and equipment.

In another aspect, when in a second configuration, the shelter may be configured to allow a user to ice fish from an interior space within the shelter.

In another aspect, the transport mechanism may be casters.

In another aspect, the transport mechanism may be skis.

In another aspect, the apparatus may include removable metal panels.

In another aspect, the removable metal panels may be on the apparatus in the second configuration and may be removed in the first configuration.

In another aspect, the metal panels may have a plurality of sloped portions defining a roof.

In another implementation of the invention, a method of operating the ice fishing apparatus comprises:

obtaining a portable ice fishing apparatus, the portable ice fishing apparatus having a base comprised of a plurality of foldable walls, a transport mechanism affixed to a bottom surface of the base, and a removable panel within the base;

unfolding each of the plurality of walls such that the plurality of walls form a platform;

attaching a shanty to the platform by affix the shanty to a top surface of the platform through a securing means;

removing the removable panel from the base.

In another aspect, the securing means may be a plurality of anchors and ties.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a portable ice fishing apparatus that is designed and configured to be used both as a platform one can ice fish on, as well as a shelter and/or storage unit. The ice fishing apparatus may include a plurality of foldable walls forming a base and a transport mechanism affixed to a bottom surface of the base. The ice fishing apparatus may also include a removable panel is at least one of the foldable walls of the base, wherein the removable panel may be removed such that a user may drill a hole into ice at that spot. The ice fishing apparatus may serve as a storage apparatus to better allow for transport of equipment to and from ice fishing sites and may be attached using a hitch to a vehicle or snowmobile.

Figure 1:
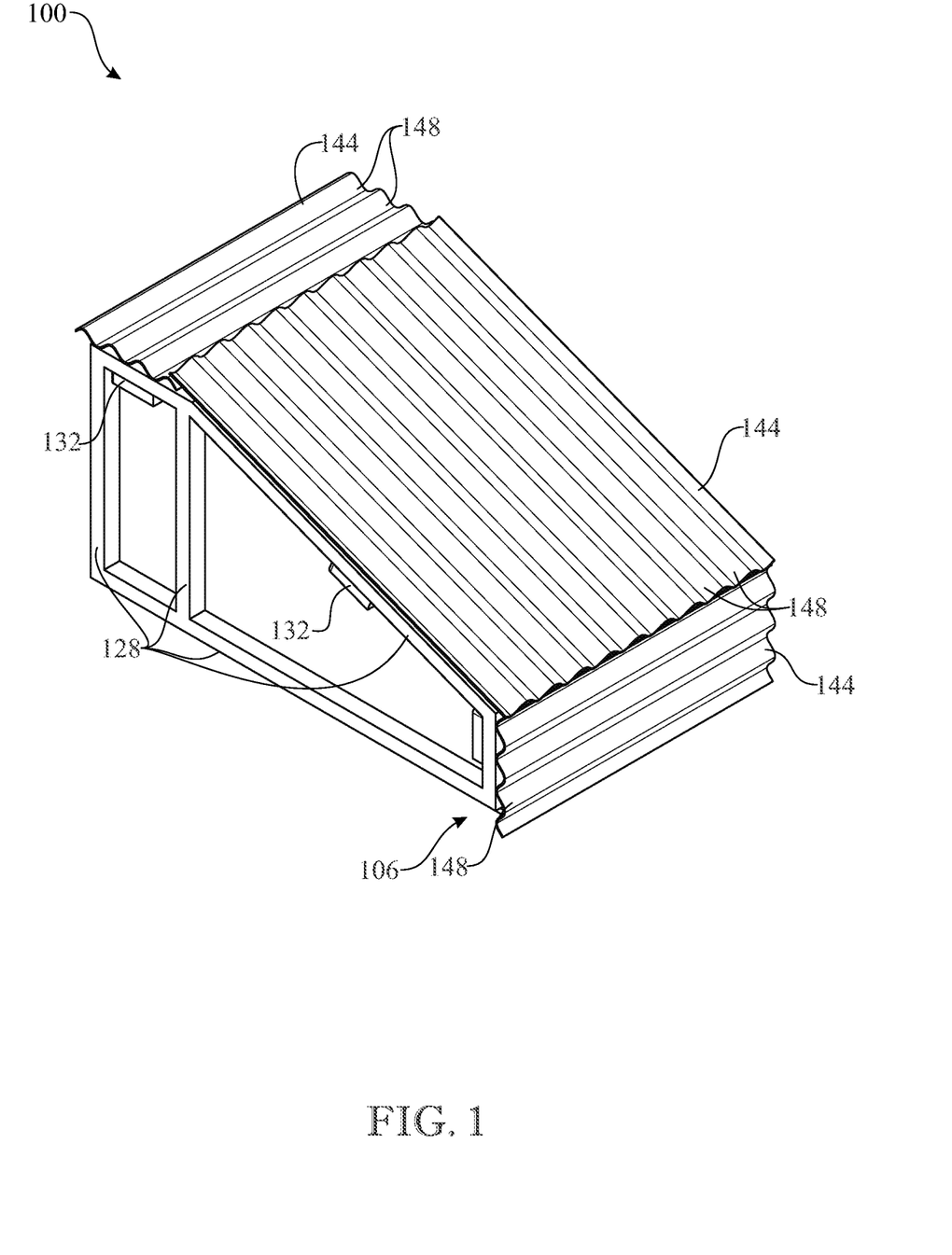
FIG. 1 presents a front perspective view of a portable ice fishing apparatus, in accordance with a first illustrative embodiment of the invention.

Referring initially to FIG. 1, an ice fishing apparatus 100 is illustrated in accordance with an exemplary embodiment of the present invention. As shown, the ice fishing apparatus 100 has a plurality of foldable walls 104 forming a base 106. As will be described in greater detail hereinafter, the ice fishing apparatus 100 is configured to adopt a closed configuration, wherein the apparatus resembles a shelter or a storage. Alternatively, as best shown in FIG. 6, the apparatus 100 may also be configured to adopt an open configuration wherein the apparatus resembles a platform configured to allow a user to ice fish on.

Figure 2:
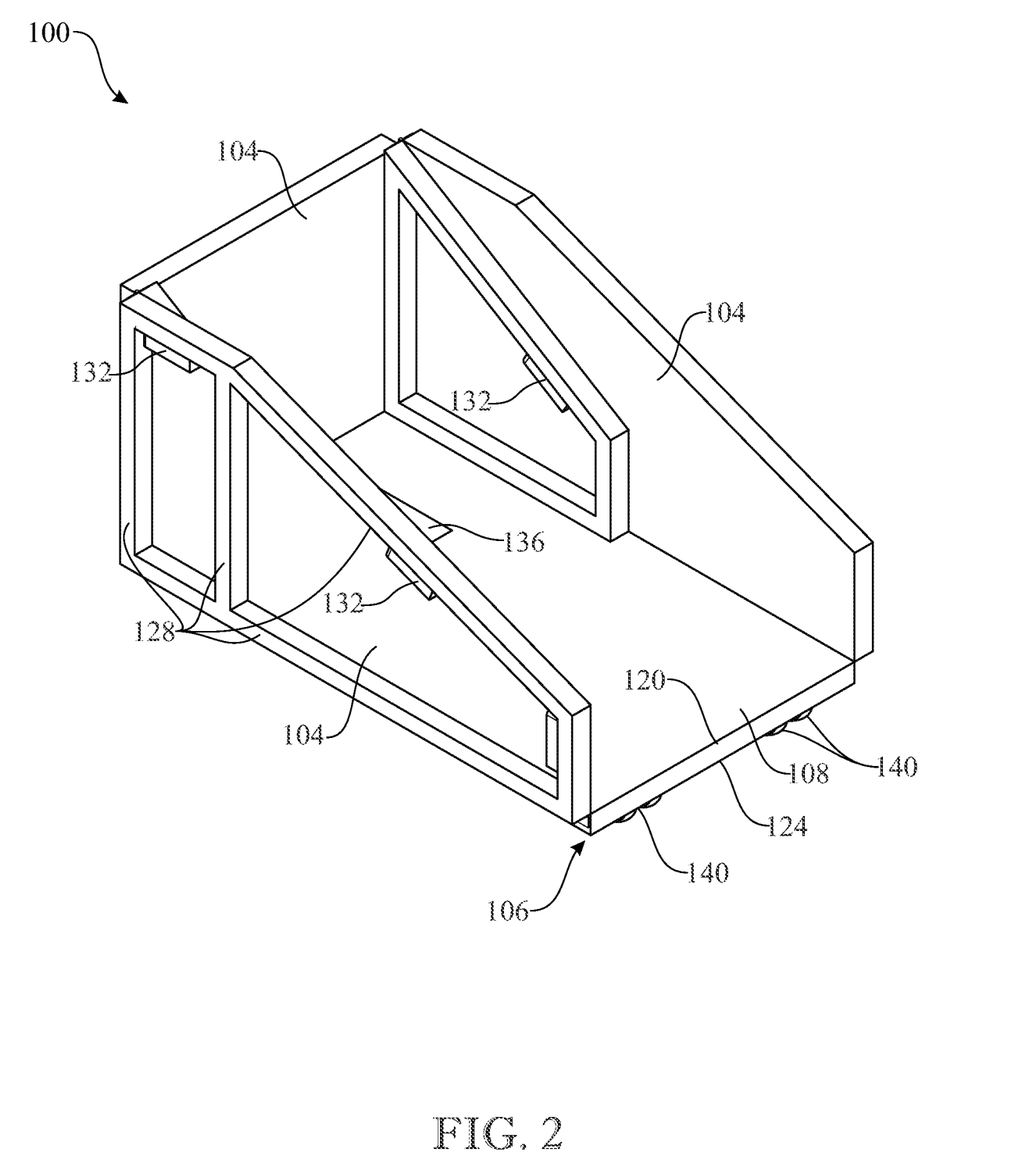
FIG. 2 presents a front perspective view of the portable ice fishing apparatus illustrated in FIG. 1, shown with the metal removable panels removed.
Figure 5:
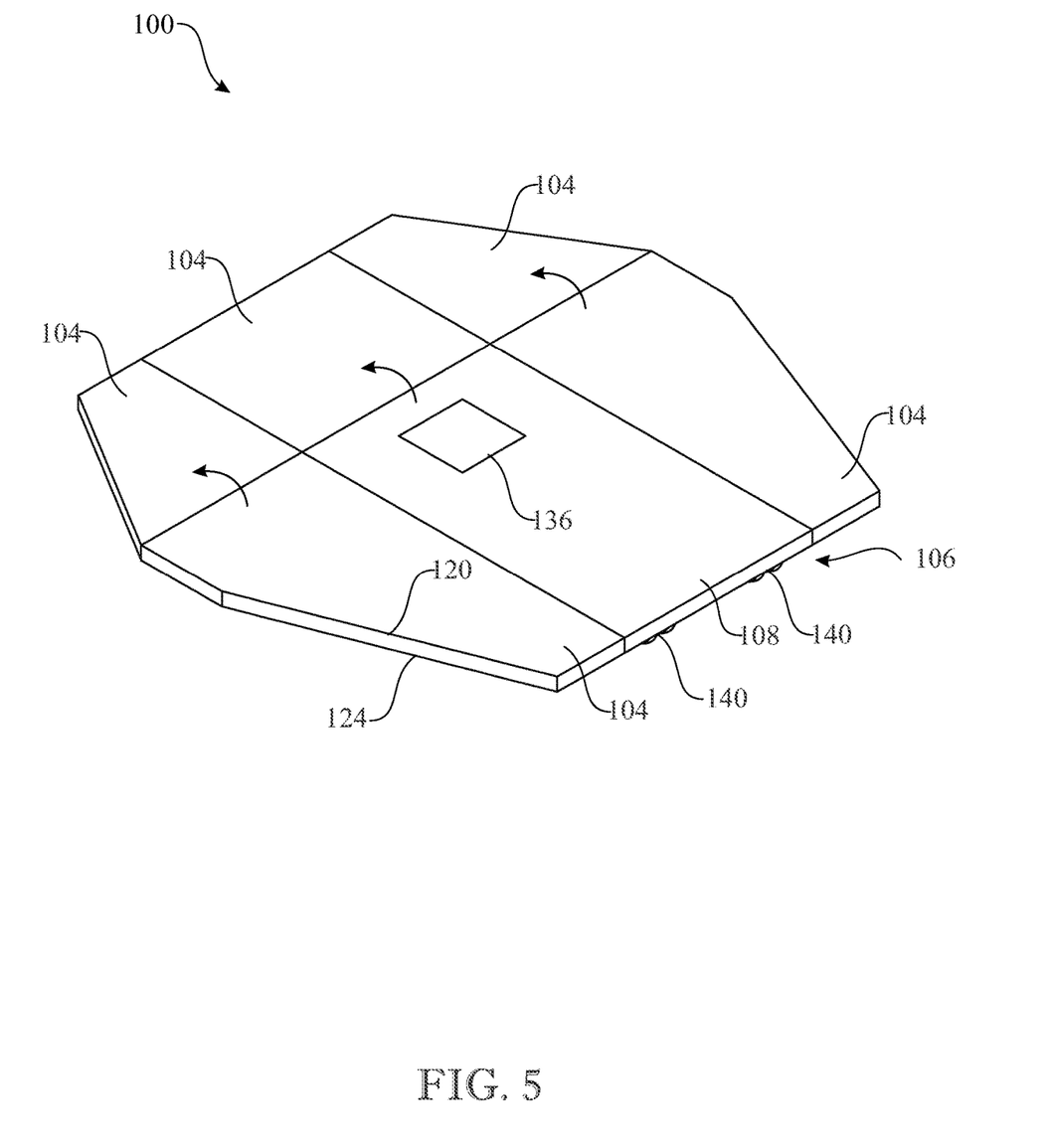
FIG. 5 presents a front perspective view of the ice fishing apparatus illustrated in FIG. 4, shown with all the foldable walls in an unfolded configuration.

Referring now to FIG. 5, the apparatus 100 is shown in a first open configuration. The plurality of foldable walls 104 forming the base 106 may also include a center wall 108 to which each of the plurality of foldable walls 104 are attached. The attachment may be facilitated through a hinge system 112, as best shown in FIG. 2. The hinge system 112 may include a single dowel 116 forming a full length hinge, best illustrated in FIG. 3. The dowel 116 may be comprised of aluminum. Alternatively, embodiments may be envisioned wherein the dowel is comprised of another metal, metal alloy, or wood. Referring back to FIG. 5, when in an open configuration the plurality of foldable walls 104 may form a hexagon. Alternatively, embodiments are envisioned wherein the plurality of folded walls form a square. The general shape of the plurality of foldable walls 104 may be any shape being able to accommodate a shanty to allow at least one user to ice fish.

Figure 3:
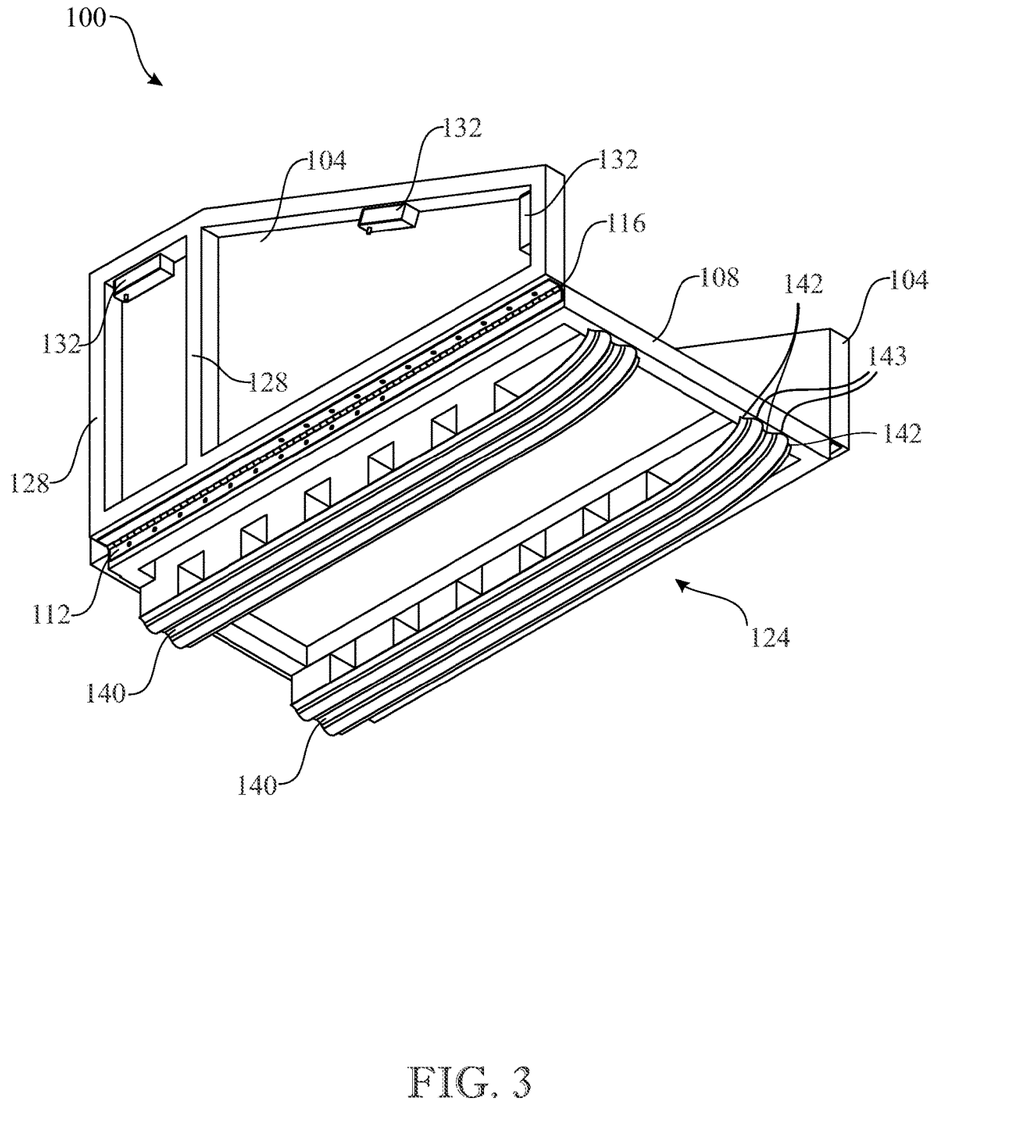
FIG. 3 presents a bottom perspective view of the ice fishing apparatus, illustrated in FIG. 2.

Referring back to FIG. 5, in some embodiments, such as the preferred embodiment, each of the plurality of foldable walls 104 may be comprised of wood. Alternatively, the plurality of foldable walls 104 may be comprised of a metal or metal alloy. Each of the plurality of foldable walls 104 may have a top surface 120 and a bottom surface 124. As best shown in FIG. 3, the bottom surfaces 124 may include a plurality of struts 128 about the end of each of the foldable walls 104. The plurality of struts 128 may provide added structural support to the apparatus 100. Additionally, the plurality of struts 128 may be configured to hold collapsible legs 132. For the apparatus. As best shown in FIG. 6, the collapsible legs 132 may be cuboidal in shape and may be deployed when the apparatus 100 is the first open configuration. The collapsible legs 132 may provide an indeterminate amount of clearance between the base 106 of the apparatus and a ground.

Figure 6:
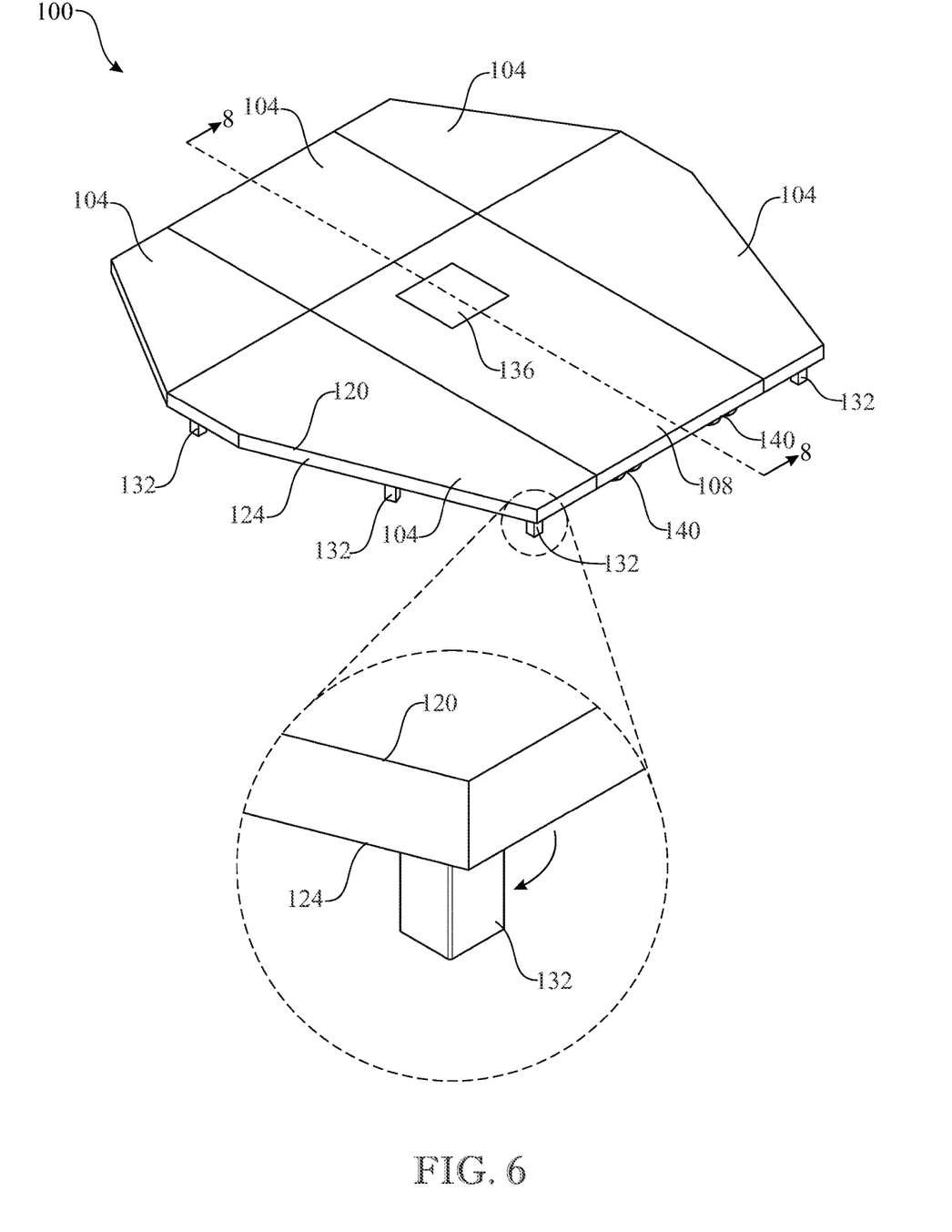
FIG. 6 presents a front perspective view of the ice fishing apparatus illustrated in FIG. 5, shown with the collapsible leg shown in an un-collapsed position and blown-up view of the collapsible leg.
Figure 7:
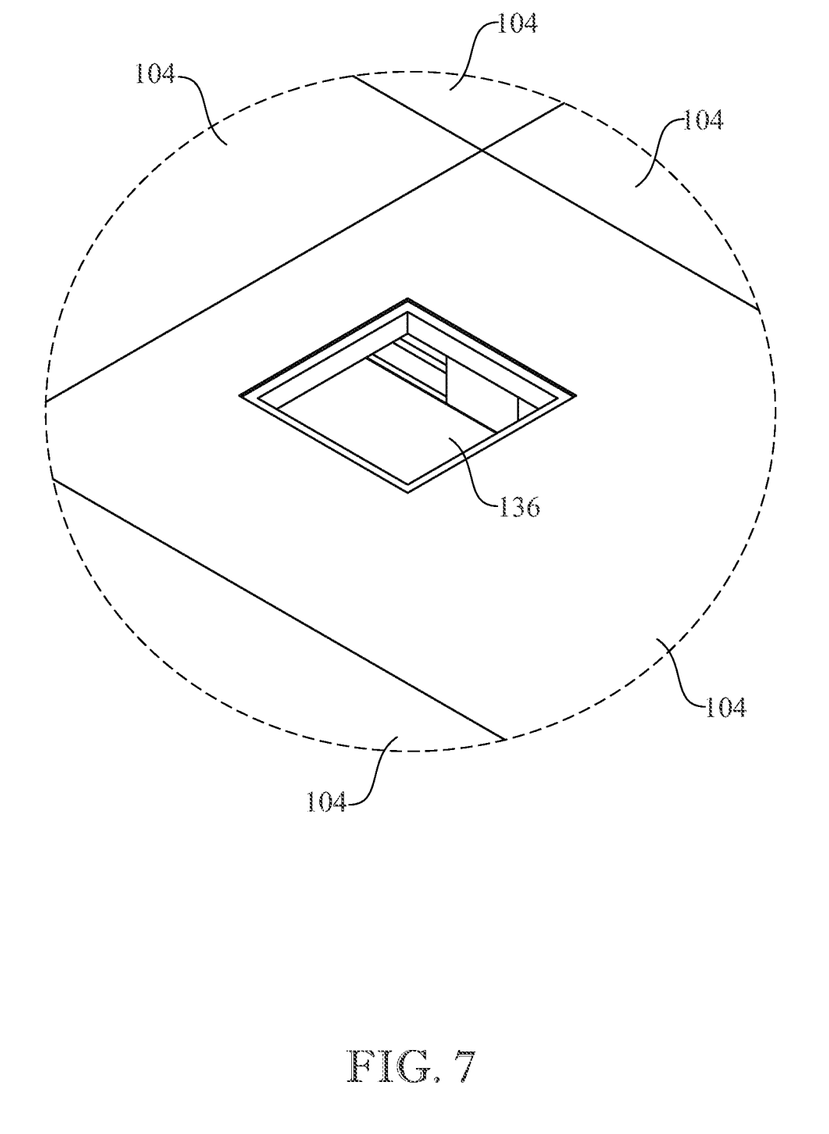
FIG. 7 presents a blown-up view of the removable panel of the ice fishing apparatus shown in FIG. 6.
Figure 8:
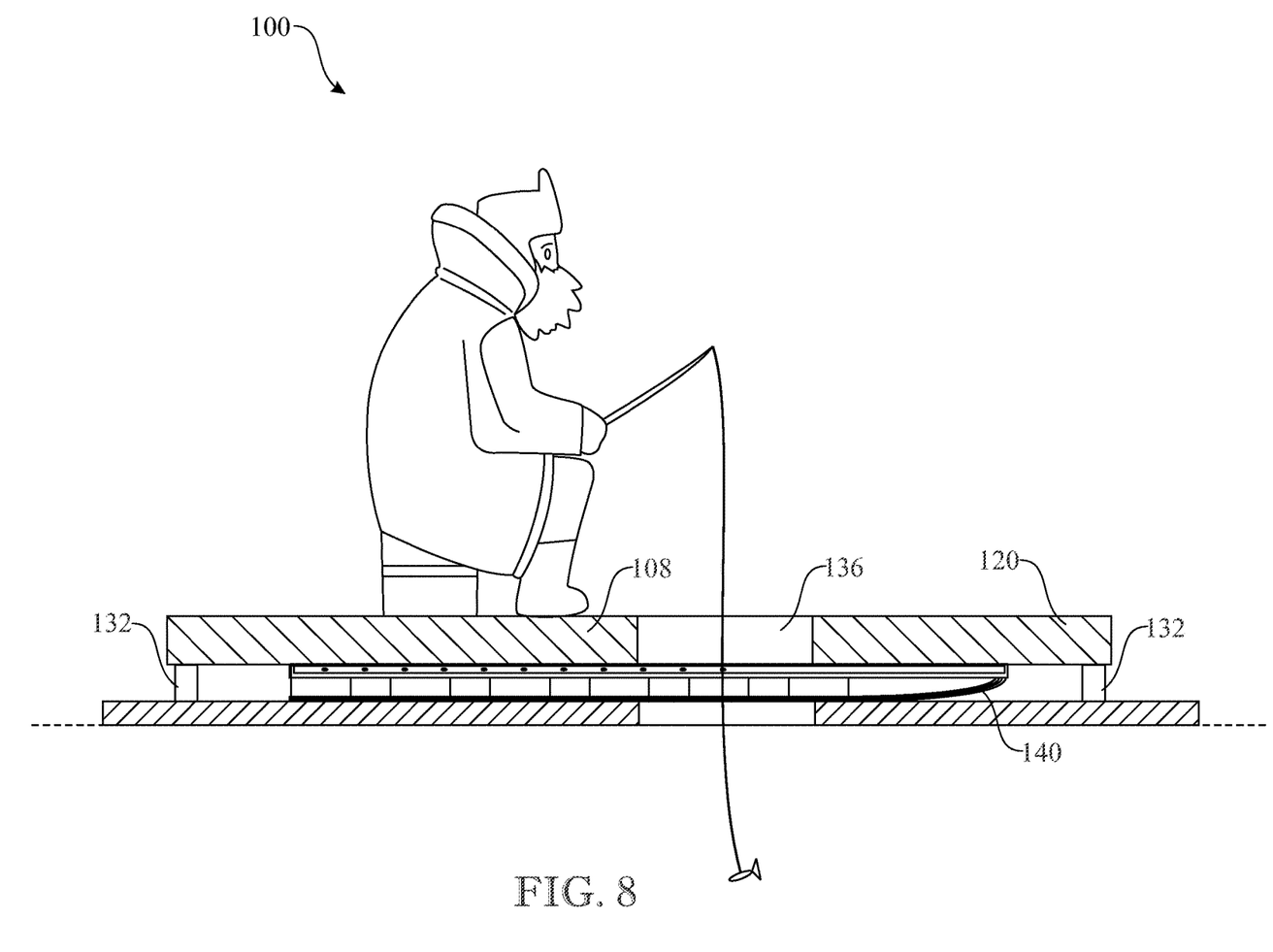
FIG. 8 presents a cross-sectional side view of ice fishing apparatus illustrated in FIG. 6, shown in an unfolded position and in use for ice fishing.

With continued reference to FIG. 6, the top surface 120 of at least one of the plurality of foldable walls 104 may include a removable panel 136. In the preferred embodiment, the center wall 108 may include the removable panel 136. As best shown in FIG. 7 and FIG. 8, the removable panel 136 may provide access to the ground such that a hole may be drilled for ice fishing.

Referring now to FIG. 3 the bottom surface 124 of the center wall 108 may also include a transport mechanism 140 for hauling the apparatus 100. In some embodiments, the transport mechanism 140 may be casters. In other embodiments such as the preferred embodiment, the transport mechanism 140 may be skis. The skis may be may be corrugated such that they have three raised sections 142 and two recessed sections 143.

Referring now to FIG. 2, the apparatus 100 may also include removable metal panels 144, shown in FIG. 1. The metal panels 144 may sit on at least some of a side edges of the foldable walls 104. The metal panels 144 may include a plurality of sloped portions 148 such that some portions are raised and others are recessed. The metal panels 144 may be configured to serve as a roof for the apparatus 100 when the apparatus is in the second configuration. The second configuration is also shown in FIG. 2, wherein the metal panels 144 have been removed.

Figure 4:
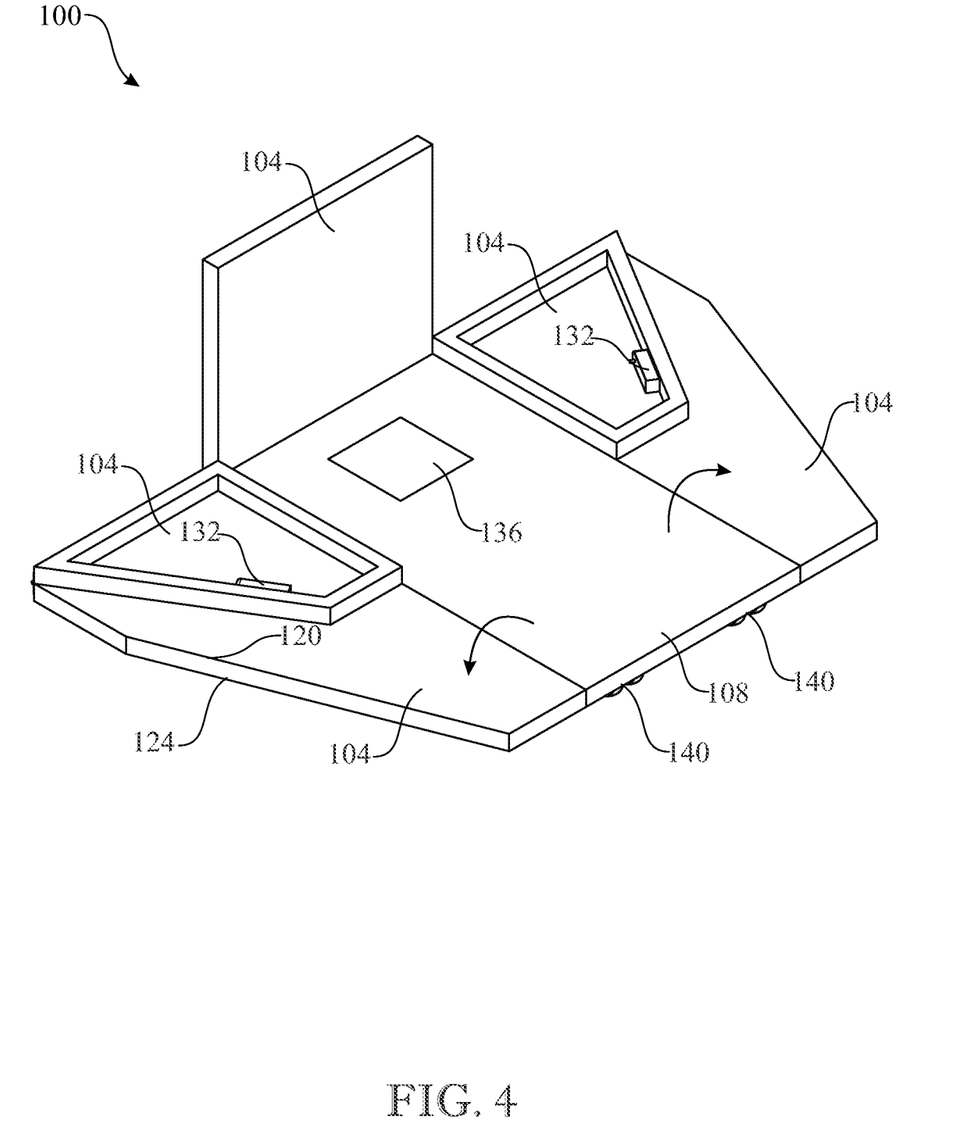
FIG. 4 presents a front perspective view of the ice fishing apparatus illustrated in FIG. 2, shown with at least some of the foldable walls in an unfolded configuration.

Referring now to FIGS. 1-8, a method of operating the portable ice fishing apparatus 100 is shown. Referring initially to FIG. 3, the apparatus 100 may be hauled to an ice fishing site first by attaching a hitch on the apparatus 100 to a vehicle or tow of some sort. Upon reaching the ice fishing site, the apparatus 100 may then be hauled or dragged to the specific site. Hauling and dragging the apparatus may be aided by the transport mechanism 140 on the bottom surface 124 of the base. Referring now to FIG. 1-2, upon reaching the specific ice fishing site, the plurality of metal panels 144 may be removed from the foldable walls 104. Upon removing the metal panels 144, each of the plurality of foldable walls 104 may be folded off the center wall 108 as best shown in FIG. 4-5. The folding mechanism for each of the walls may be the aforementioned hinge system 112. Each of the plurality of foldable walls 104 may fold off the center wall about the dowel 116. At that point, each of the plurality of foldable walls 104 may lay flat on a ground, as best shown in FIG. 5. Once unfolded, each of the collapsible 132 may be put in a down position such that the base 106 of the apparatus 100 has an indeterminate amount of clear from the ground, as shown in FIG. 6. Referring now to FIG. 7, a user may then remove the removable panel 136 from the center wall 108. As shown in FIG. 8, this would allow the user to then drill a hole on the ground/ice such that ice fishing may be commenced. Optionally, a user may choose to put a shanty on the base 106 and over the removable panel 136. Alternatively, a user may leave the foldable walls 104 in the first configuration as shown in FIG. 1. That may allow the user to use the apparatus 100 as a shanty itself.

Alternative embodiments are contemplated to those shown or described herein without departing from the scope of the present disclosure. For example, embodiments are contemplated in which the apparatus encompasses larger sizes and shapes so as to accommodate ice fishing groups of varying sizes. This may be accomplished, for instance, through a base that may be further expandable. Another alternative embodiment considered is potentially having a hitch built into at least a side portion of the base. Having a hitch built in may help in affixing the apparatus to a vehicle. Another alternative embodiment may include removing the collapsible legs and having the struts on the serve as the clearance above the ground. Lastly, embodiments are envisioned in which the number of removable panels and the placement of the removable panels may vary. This may allow a user to drill multiple holes in an ice fishing site, and the placement of the drills may be more modular if the removable panels are place in more than just the center wall.

In summary, the ice fishing apparatus disclosed herein provides a device which adopts multiple configurations to assist ice fisherman. Namely, the apparatus is able to adopt a first configuration wherein the apparatus serves as a platform that allow a user to ice fish and set up a shanty on the platform. However, the apparatus is also able to serve as a shelter such that items may be transported within the apparatus. Similarly, in that second configuration, the apparatus may be used as a shanty in and of itself. Another benefit of the apparatus is the transporting means. By having a transporting mechanism on the bottom surface of the base, such as skis, it allows the apparatus to be easily transported in a variety of weather conditions and terrains.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A portable ice fishing apparatus comprising:
    a plurality of foldable walls forming a base, where each of the of the foldable walls includes a top surface and a bottom surface;
    a transport mechanism affixed to a bottom surface of the base;
    a removable panel within at least one of the foldable walls of the base; wherein the apparatus is configured to adopt:
    a first configuration wherein each of the plurality of foldable walls are in a down position forming a platform; and
    a second configuration wherein at least one of the plurality of foldable walls is in an up position forming a shelter.

2. The portable ice fishing apparatus according to claim 1, wherein the plurality of foldable walls is connected through a hinge system.

3. The portable ice fishing apparatus according to claim 2, wherein the hinge system includes a single dowel connecting each of the plurality of foldable walls and forming a full-length hinge.

4. The portable ice fishing apparatus according to claim 2, wherein the hinge system includes a single dowel connecting each of the plurality of foldable walls and forming a full-length hinge.

5. The portable ice fishing apparatus according to claim 1, wherein the plurality of foldable walls forms a square when the apparatus is in the first configuration.

6. The portable ice fishing apparatus according to claim 1, wherein the plurality of foldable walls forms a hexagon when the apparatus is in the first configuration.

7. The portable ice fishing apparatus according to claim 1, wherein at least one of the plurality of foldable walls forms a side wall when in the second configuration.

8. The portable ice fishing apparatus according to claim 1, wherein the plurality foldable walls is comprised of wood.

9. The portable ice fishing apparatus according to claim 1, wherein each of the bottom surfaces of each of the plurality of walls includes outer struts configured for support.

10. The portable ice fishing apparatus according to claim 1, wherein the bottom surface of the foldable walls includes a plurality of collapsible legs.

11. The portable ice fishing apparatus according to claim 10, wherein when in the first configuration, the plurality of collapsible legs is configured to provide clearance for the platform.

12. The portable ice fishing apparatus according to claim 1, wherein when in the second configuration, the shelter is configured to hold various items and equipment.

13. The portable ice fishing apparatus according to claim 1, wherein when in the second configuration, the shelter is configured to allow a user to ice fish from an interior space within the shelter.

14. The portable ice fishing apparatus according to claim 1, wherein the transport mechanism is casters.

15. The portable ice fishing apparatus according to claim 1, wherein the transport mechanism is skis.

16. The portable ice fishing apparatus according to claim 1, wherein the apparatus includes a plurality of removable metal panels.

17. The portable ice fishing apparatus according to claim 16, wherein the plurality of removable metal panels is on the apparatus in the second configuration and are removed in the first configuration.

18. The portable ice fishing apparatus according to claim 16, wherein the plurality of metal panels has a plurality of sloped portions defining a roof.

19. A method of operating an ice fishing apparatus, comprising the steps of:
    obtaining a portable ice fishing apparatus, the portable ice fishing apparatus including plurality of foldable walls forming a base, wherein each of the of the foldable walls includes: a top surface and a bottom surface, a transport mechanism affixed to a bottom surface of the base, a removable panel within at least one of the foldable walls of the base; and further wherein the apparatus is configured to adopt: a first configuration wherein each of the plurality of foldable walls are in a down position forming a platform, and a second configuration wherein at least one of the plurality of foldable walls is in an up position forming a shelter;
    unfolding each of the plurality of walls such that the plurality of walls form a platform;
    attaching a shanty to the platform by affix the shanty to a top surface of the platform through a securing means; and
    removing the removable panel from the base.

20. The method of operating the portable ice fishing apparatus according to claim 19, wherein the securing means are a plurality of anchors and ties.

* * * * *